March 7, 1961 — T. N. OPPENHEIM — 2,973,978

BIMATERIAL BACK-UP RING

Filed Aug. 21, 1957

*INVENTOR.*
THOMAS N. OPPENHEIM

BY Charles F. Dischler

ATTORNEY

United States Patent Office 2,973,978
Patented Mar. 7, 1961

2,973,978

BIMATERIAL BACK-UP RING

Thomas N. Oppenheim, Los Angeles, Calif., assignor to North American Aviation, Inc.

Filed Aug. 21, 1957, Ser. No. 679,465

11 Claims. (Cl. 286—26)

This invention relates to dynamic sealing or packing arrangements and, in particular, it relates to the use of the bimaterial back-up ring in conjunction with standard type sealing or packing rings in order to increase the life cycle and extend the operating range under severe temperature and pressure environmental conditions.

It is common practice to reinforce an elastomeric packing or O-ring by means of washers such as of the split ring or Chevron type back-up. These washers have heretofore been formed of leather and fiber for low pressure applications and of relatively nondeformable materials, such as synthetic plastics, synthetic resins, metals and the like, for higher pressure applications. The back-up washer prevents extrusion of the softer packing ring into the space between the members being sealed. When such back-up rings are made of metal it has been found that they damage the O-ring by nibbling or chewing the small portion of the sealing ring that is continually pressure extruded between the two sealed members. Additionally, such metal rings introduce a high degree of friction into the packing arrangement, due to the relatively large coefficient of friction of such metals on the cylinder wall or piston rod metallic surfaces. Various elastomeric materials such as rubber, silicone rubbers, neoprene, Teflon and the like have been found to form packings and O-rings that generally operate satisfactorily under ordinary temperature and pressure conditions.

Thermodynamic studies conducted by the aircraft industry have shown that future supersonic aircraft will require a so-called Type III hydraulic system, as designated by Army-Navy Specifications, for dependable operation. Such a system must operate in the temperature range from −65° to 400° F. and at pressures of 3,000 p.s.i.g. (and often at even higher temperatures and pressures) thereby exceeding the useful ranges of any prior known sealing materials, or combinations thereof, when used in the gland and seal designs known in the prior art.

The use of elastomers in the dynamic packing glands of a Type III hydraulic system component is generally unsatisfactory in two respects. First, the initial and aged physical strength of useful elastomers are considerably below the required operational strength level. This factor makes the elastomer dependent on back-up rings for support. Prior to this invention, most packing failures at high temperatures and pressures could be traced to the inability of the backups to fulfill the rigid elastomer O-ring support requirements. The two most important and seemingly contradictory back-up material requirements are a high Poisson's ratio to prevent O-ring nibbling, and high strength to prevent back-up extrusion. The second of the unsatisfactory physical characteristics in O-ring elastomers operating at high temperatures is the compression set induced therein. This compression set is a measure of the ability of an elastomer to regain its original shape upon release of a compression load. This ability is diminished or eliminated by high temperature aging, so that subsequently at low temperatures and pressures, fluid leakage will occur past the seal due to loss of initial "squeeze" or sealing ability.

The solution to the above problems lies either in O-ring compounding, in which little hope is foreseen, or in the mechanical design of the gland. It is to this latter aspect of the problem that this invention is directed.

High temperature hydraulic packing problems are not entirely confined to the O-ring elastomer, but are also partially the result of back-up materials being no more compatible to high temperatures and compressive loads than the O-ring itself. In the past, Teflon has been used to good advantage as a back-up material for dynamic packings because of its excellent frictional and wear characteristics. Teflon is the Du Pont trademark applied to polymers of tetrafluoroethylene. Teflon is a fairly soft, flexible, nonporous, tough material having a coefficient of friction, with respect to metal surfaces, of the magnitude of about 0.1 as compared to a coefficient of friction of 0.45 for a rubber O-ring. At high temperatures the desirable frictional and wear properties of Teflon are exceeded by the detrimental material deformation and cold-flow which result in the extrusion of the Teflon through narrow gland clearances in order to support the compressive O-ring force. The extruded Teflon is readily sheared off and additional Teflon must flow into the clearance to support the load. When the Teflon cross section is reduced sufficiently, the O-ring is no longer supported and fails. The use of thick, single-turn Teflon back-up rings has improved some of the detrimental extrusion problems and has increased the longevity of O-rings used therewith. Still there exists sufficient Teflon extrusion at the higher temperatures and pressures that the initial volume of the material in the packing groove is decreased and the stress distribution throughout the O-ring detrimentally changed. The optimum approach to a better packing combination, therefore, requires the maintenance of a constant stress level throughout the O-ring by keeping the occupied volume of the gland constant for the life of the ring.

The present invention, therefore, is directed to a sealing arrangement wherein a bimaterial back-up ring allows the efficient utilization of an elastomeric seal of the O-ring type and prevents extrusion of the seal and the back-up ring materials and which is particularly adapted for efficient long-life operation at elevated temperatures and pressures. This result is achieved by the use of a plastic polymer having high surface lubricity and a low modulus of elasticity in conjunction with a higher strength material forming a cap ring or support member for strengthening the back-up ring member and substantially closing the clearance gap between movable members.

Accordingly, it is an object of this invention to provide a sealing arrangement that is effective under severe operating conditions of temperature and pressure.

It is an object, also of this invention, to provide a sealing arrangement whose longevity greatly exceeds that of any prior elastomeric type seal for such elevated temperature and pressure conditions.

It is also an object of this invention to provide a sealing arrangement having a bimaterial back-up ring and possessing optimum frictional and strength characteristics whereby extrusion of the back-up ring and associated seal ring is prevented without unduly affecting the friction of the sealing arrangement.

It is a further object of this invention to provide a sealing arrangement utilizing a back-up ring composed primarily of a material having a low coefficient of friction with good dimensional stability characteristics and a second material having a higher coefficient of elasticity encircling a portion of the primary back-up ring and strengthening such back-up ring while sealing the extrusion clearance between the piston and cylinder or between the piston rod and cylinder end.

It is also an object of this invention to provide a composite bimaterial back-up ring having discrete portions, each with a different coefficient of thermal expansion, predeterminately dimensioned to ensure substantial closing of the clearance gap between relatively movable elements by expansion of that portion of the ring having the larger coefficient of expansion.

These and other objects and advantages of the present invention will become apparent to those skilled in the art after reading the present specification and the accompanying drawings forming a part thereof, in which.

Figure 1:
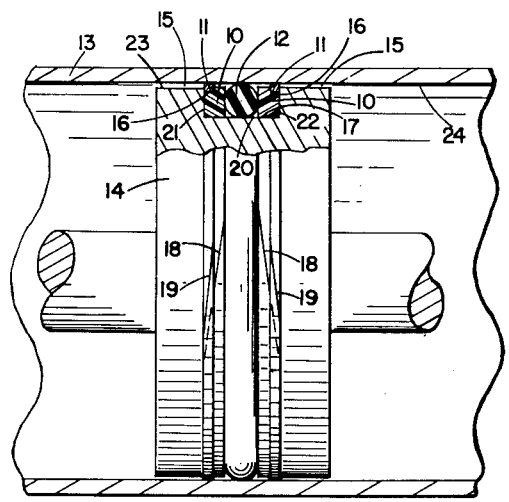
Fig. 1 is a fragmentary view partly in elevation and partly in section of a reciprocating cylinder and piston combination showing the sealing arrangement, in accordance with this invention, as applied to the piston.

Referring specifically to the drawings wherein like reference characters have been used throughout the several views to designate like parts and referring at first to the cylinder and piston arrangement of Fig. 1, numeral 10 designates an annular back-up ring seated in a groove 17 for preventing pressure extrusion of the softer elastomeric O-ring 12. For the purposes of the present illustration, it will be assumed that the back-up ring 10 consists of material having a high degree of natural lubricity with an inherent low coefficient of friction, such as the Teflon type of polytetrafluoroethylene plastics. This invention is not to be understood as being limited to one or more particular types of back-up ring material but, as will be set forth later, a number of different materials have been found suitable for these purposes. However, for the purposes of this disclosure the invention will be described as utilizing a preferred primary back-up ring of Teflon. At its outer edge ring 10 has a reduced diameter portion formed by rabbeting or notching, thereby forming an annular shoulder 16. In comparison to the volume of the ring 10 this cutout portion is a relatively small part of back-up ring 10. As shown in Fig. 1, ring 10 is preferably formed with a scarfed joint 18 for ease of installation and to prevent extrusion of the O-ring through such joint. Similarly cap ring 11 has a scarfed joint 19 for the same reasons.

A rectangular-section cap ring 11 is dimensioned to fit the annular shoulder 16 of the back-up ring 10. The outer diameter of ring 11 may initially be made greater than the outer diameter of back-up ring 10, or it is selected to have a greater coefficient of thermal expansion and dimensioned so that it projects above the outer surface of the ring 10 a predetermined amount at the operating temperature and pressure. By design this projection is sufficient to bridge the clearance gap between the movable members to place the outer surface of ring 11 in sliding contact or nearly in sliding contact with the cylinder wall 13.

A typical installation, shown in Fig. 1, illustrates two back-up rings according to this invention mounted axially adjacent O-ring 12 in sealing groove 17, O-ring 12 customarily being formed of elastically deformable, pressurally extrudable material such as rubber, either of the butyl or Buna S type, silicones, neoprenes, Teflon, or Viton A. The O-ring is customarily mounted in an annular groove 17 having bottom wall 20 and sidewalls 21 and 22 and is formed, in this case, in piston member 14 which is mounted within cylinder member 13, these members having their respective concentric cylindrical surfaces 23, 24 in sliding relationship.

Figure 2:
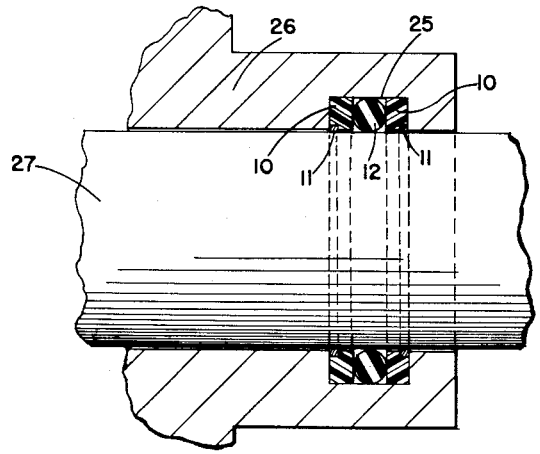
Fig. 2 is a fragmentary sectional view of a reciprocating piston rod and cylinder end wall showing the sealing arrangement of this invention applied to the piston rod.
Figure 4:
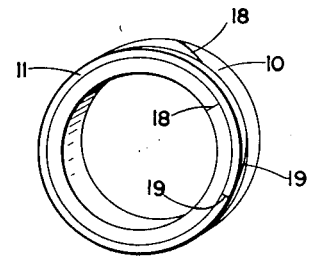
Fig. 4 is a perspective view of the bimaterial back-up ring of this invention.
Figure 3:
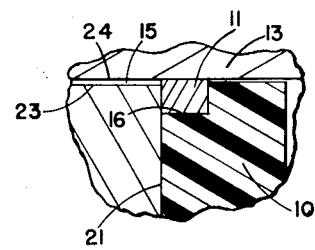
Fig. 3 is an enlarged detailed sectional view of the composite back-up ring arrangement of this invention showing the relationship of the cap ring to the relatively movable annular wall and the piston or piston rod surfaces.

It will be apparent to those skilled in the art that the sealing arrangement of this invention is applicable to internal glands as well as the external type gland described above. As shown in Fig. 2, the present sealing arrangement is adapted for mounting in an annular groove 25 formed in the outer mating member, or cylinder head 26, as for sealing a piston rod 27. While cap ring 11 is not limited to any particular material, as will be shown later herein, for the present it will be considered to be as a thin metal single-turn ring.

The operation of the back-up ring utilizing a metal cap ring is such that upon installation of the piston and packing into the cylinder barrel, Fig. 1, the metal cap ring expands radially in its high temperature environment and due to hoop tension against the wall of the barrel closes the extrusion clearance 15 between the piston and cylinder wall surfaces 23 and 24, respectively. Whether or not the cap ring is of metallic or nonmetallic construction when pressure is applied in either axial direction the resultant compressive force on one of the Teflon rings 10 assists in holding the associated cap ring 11 in place to seal the extrusion clearance 15 and prevents the back-up ring material, and thereby also the elastomeric O-ring, from flowing or extruding out of the gland.

The O-ring makes the seal at all times by a wiping contact on the adjacent movable surface. The back-up rings never do the actual sealing as such. Their function is simply one of support for the O-ring. This holds true in the case of the bimaterial two-piece back-up ring of this invention as well as for a homogeneous back-up ring.

Extensive tests have been conducted in a curvilinear test stand to determine the best sealing materials and their optimum arrangement and dimensions. The curvilinear test stand comprised a reciprocating piston type actuator or test cylinder pivotally mounted at one end with the piston rod pivotally connected to one end of a bellcrank which had its other end connected to a load cylinder. The curvilinear movement of the piston rod end introduces eccentric loading stresses into the seal test structure. While the magnitude of these eccentric stresses is relatively low their effect is to cause uneven and accelerated wear of the seal components comparable to any severe operating conditions that might be encountered in actual use.

The temperature of the hydraulic fluid was controlled by means of heat exchangers which readily permitted cycling of the test seals through the requisite temperature ranges. In general, one thermal cycle under Type III conditions consisted of raising the hydraulic fluid to its maximum temperature of 400° F., operating the actuator through approximately 2,000 reciprocation cycles under load, then decreasing the hydraulic fluid temperature to −65° F. and reciprocating the actuator for ten low pressure cycles at 350 p.s.i. and ten high pressure cycles at 3,000 p.s.i. without load, and then rapidly increasing the temperature to 100° F. without load. At each step the static leakage was checked prior to operation and the subsequent dynamic test. This constituted one thermal sequence or cycle with the rate of leakage for the piston seal being based on the leakage taken statically per minute and prorated to the required specification over a one-hour test run. The allowable leakage for the dynamic seals for reciprocating movement, tested herein, was set at less than one cubic centimeter/1000 cycles or one cubic centimeter/hour.

In addition to testing the various seals under the operating pressure and temperature of Type III hydraulic systems, the severity of the tests was increased in many instances by raising the test temperature and pressure to 450° F., and 4,000 p.s.i., respectively.

The tests performed utilized two packing sizes, conforming to Army-Navy Specifications Nos. AN 6227–16 and AN 6227–23 in modified Type II glands of 0.400 width. It is believed that the test results obtained warrant the use of the preferred back-up design in the optimum dimensions established by the tests for gland sizes AN 6227–15 through AN 6227–27. For the larger gland sizes AN 6227–28 through AN 6227–52 the back-up dimensions should be based on results of the smaller test sizes in conjunction with theoretical gland analysis.

Development tests have further indicated that eighty-four percent, plus or minus three percent of total gland occupancy measured at room temperature represents the desirable packing design installation limits for successful sealing at high temperatures with a preferred gland occupancy of 83–85%. This percentage gland occupancy at room temperature was determined to be the optimal value since a larger value would approach one-hundred percent gland occupancy at temperatures of 400° F. and higher, while a smaller occupancy would allow a disarrangement of the bimaterial back-up due to axial movement of the two parts of the back-up. For packing gland sizes AN 6227–15 through AN 6227–52 the predicted theoretical gland occupancy at 400° F. due to thermal expansion of the back-ups and the O-ring and swelling of the O-ring due to immersion in the hydraulic fluid will be approximately ninety-two percent of the gland volume when the initial gland occupancy is in the preferred range of 83–85%.

Various combinations of materials have been tested at the prescribed temperatures and pressures to determine the optimum material for the individual elements of the sealing arrangement including the seal itself, the back-up ring, the cap or support ring, and the cylinder and piston metal surfaces.

Viton A, an elastomer manufactured by E. I. du Pont Company and consisting of a copolymer of vinylidene fluoride and hexafluoropropylene, has been found to be an excellent material for O-rings due to its outstanding temperature and fluid resistance properties. Viton A, in general, is superior to other standard O-ring elastomeric materials such as neoprene, silicone, rubber and the like and is preferable for use in elevated temperature hydraulic systems. A disadvantage of Viton A elastomers is in its lack of elasticity at −65° F., but for many installations this can be disregarded.

Teflon, in general has excellent properties for use as a back-up material since it has a low modulus of elasticity, a low coefficient of friction, and good lubricity qualities. The low modulus of elasticity makes it a desirable material adjacent to an elastomeric O-ring in order to prevent nibbling of the O-ring. The principal defect of Teflon under severe operating conditions is its lack of high structural strength to resist deformation and cold-flow. Another Teflon containing material that lends itself to back-up use where the temperature requirement is somewhat lower than that required in a Type III installation, is the material known as Duroid 5600. This material is composed of a ceramic matrix that is filled with Teflon and is manufactured by the Rogers Corporation, Rogers, Connecticut. Duroid 5600 has an advantage over pure Teflon in that it maintains its dimensional stability better at temperatures up to 400° F. However, the best Teflon composition for back-up purposes, consists of pure Teflon impregnated with graphite in the range of approximately 20% to 35% by volume. Such graphite-filled Teflon has the advantage over pure Teflon of greater resistance at elevated temperatures to deformation under load, lower wear rate and lower linear thermal expansion. Other materials such as nylons, paper laminates and various vulcanized fibrous compositions were tested and found to be unsuitable for use as back-up rings due to their low Poisson ratios.

Materials tested and found suitable for the high strength cap ring structure include Zytel 101, Meehanite and stainless steel alloy 4200. Zytel 101 is one of the high strength long-chain synthetic polymeric amides known as nylon and manufactured by E. I. du Pont Company. It has an advantage over plastics generally in toughness, abrasion resistance, and dimensional stability at high temperatures. With its low coefficient of friction it has been found to make an excellent second material for the bimaterial back-up. Meehanite is a high carbon content cast iron manufactured by the Meehanite Metal Corporation of New Rochelle, New York. Stainless steel alloy 420, as manufactured by the Precision Piston Rings, Inc., normally consists of 16.0 to 18.0% chromium, 0.9 to 1.20% carbon, and the remainder iron. When hardened to a Rockwell C number of from 48 to 55, it has very good wear characteristics against nitrided nitralloy.

Various cylinder rod and cylinder barrel materials and platings were tested for their wearing ability against the back-up support rings in high temperature applications. Among such materials tested was a modified nitralloy 135 which had been nitrided to a Rockwell C hardness of 55 to 60. This alloy is composed of 0.38 to 0.43% carbon, 0.50 to 0.70% manganese, a maximum of 0.04% phosphorus, a maximum of 0.04% sulphur, 0.20 to 0.40% silicon, 1.4 to 1.8% chromium, 0.30 to 0.40% molybdenum, 0.95 to 1.30% aluminum, and the balance iron. This alloy embodied very good wear characteristics. Another suitable material was found to be SAE 4130 steel composed of 1% chromium, 1.5 to 2.5% molybdenum, 0.30% carbon, and the remainder of iron. When flame-plated, the surface of this alloy has a Rockwell C hardness number of 73–75 and shows excellent wear properties against nitrided nitralloy. Molykote X–106, manufactured by the Alpha Molykote Corporation, is a dry lubricant suitable for coating wearing surfaces to reduce friction and wear composed primarily of molybdenum disulphide in a resin toluol solution and is well suited for use with the seal arrangement of this invention.

These tests showed that for a Type III hydraulic system, having a temperature requirement of 400° F. and a pressure requirement of 3,000 p.s.i.g., the combination of a Viton A O-ring, together with a composite back-up ring of graphite impregnated Teflon with a Zytel cap ring, gave the maximum useful life for the sealing arrangement under test conditions.

For even more severe requirements (up to 450° F. and 4,000 p.s.i.g.) the most suitable material combination of those tested was found to be an O-ring of Viton A in conjunction with a back-up ring of graphite impregnated Teflon having a cap ring of stainless steel alloy 420 slidable against a nitrided nitralloy surface.

Ultimate seal failure was usually found to result from O-ring wear and deterioration as well as local O-ring deformation from loss of elastic properties. The bimaterial back-ups generally withstaood the thermal and reciprocatory cycling in good condition, withstanding as many as 100,000 endurance cycles or 50 thermal sequences from −65° F. to 400° F. for one rod type seal.

To prevent working and extrusion of the seal ring material through the back-up ring and cap ring joints each of the latter two types of rings was formed with a scarfed joint. These scarf joints were cut on an angle of 22 degrees relative to the plane of the rings. Since the support ring generally has a higher coefficient of expansion than the back-up ring, the support ring should be dimensioned so that it fills the clearance gap between the two relatively movable members at the working temperature of the seal. Control of the scarf gap for the Zytel material is particularly important and this gap should be held to a dimension of from 0.025 to 0.030 inch when measured over a mandrel equivalent to the ring's inner diameter. Insufficient gap width will result in buckling of the back-up and subsequent binding of the O-ring elastomer at 400° F. or above.

Unless the Zytel support rings are aged prior to use, it was found that the shrinkage of this material was so great as to allow the scarf gap to open with consequent extrusion and ruin of the O-ring. Thermal aging of the Zytel material may be effected by oil-aging the material, in the hydraulic fluid to be used, at 450° F. for forty-eight hours and then fabricating the support rings therefrom.

Among the hydraulic fluids showing promise for high temperature applications which operated successfully with the sealing arrangements described herein are the fluids designated OS–45–1 as manufactured by the Monsanto Chemical Company, and MLO–8200 as manufactured by the Oronite Chemical Company. OS–45–1 is an orthosilicate base fluid having the following properties:

Viscosity at:

| | | |
|---|---|---|
| −65° F. | centistokes | 2229.5 |
| 210° F. | do | 3.98 |
| 400° F. | do | 1.20 |
| Pour point | °F | −75 |
| Flash point | °F | 365 |
| Fire point | °F | 425 |
| Auto-ignition point | °F | 705 |

Oronite MLO–8200 is an alkoxy disiloxane base fluid having the following physical properties:

Viscosity at:

| | | |
|---|---|---|
| −65° F. | centistokes | 2490 |
| 0° F. | do | 200 |
| 210° F. | do | 11.78 |
| 400° F. | do | 3.82 |
| Pour point | below °F | −100 |
| Flash point | below °F | 405 |
| Fire point | below °F | 450 |
| Auto-ignition point | below °F | 760 |

While the presently known back-up rings, whether of homogeneous construction or of the one-piece composite type, such as the impregnated Teflons, are structurally able to support the O-ring elastomer seals at high pressures and elevated temperatures, they are incapable of deforming sufficiently to close the clearance gap between the back-up ring and the adjoining concentric metal surface and thereby prevent nibbling of the elastomer seal. The bimaterial back-up of this inventon, however, in the form of a two-piece composite member provides a unique and novel means for extending the operating environment of elastomeric seals into higher usable ranges of both temperature and pressure. In essence it achieves this hertofore unattainable result by providing a composite back-up ring having a portion with a low modulus of elasticity adjacent the elastomer seal and having a relatively high strength, high modulus of elasticity portion at its outer edge, away from the elastomer seal. Under high temperature and pressure the low elastic modulus portion deforms to seal the clearance gap between it and the adjacent metal surface. This prevents nibbling extrusion of the O-ring therethrough which otherwise would eventuate in failure of the seal. The high strength portion or member located at the outer edge of the back-up ring performs the dual functions of providing the back-up ring with dimensional stability at elevated temperatures and pressures as well as sealing the clearance gap against extrusion of the low elastic modulus ring portion.

While a particular embodiment of this invention has been illustrated and described herein, it will be apparent that various changes and modifications may be made in the construction and arrangements of various parts without departing from the spirit and scope of this invention in its broader aspects or as defined in the following claims.

I claim:

1. A fluid seal for high temperature, high pressure sealing between two relatively movable members having slidably fitted complementary cylindrical working surfaces with a clearance gap therebetween, one of which members contains an annular groove juxtaposed to the other working surface, said seal comprising a resilient O-ring which is the primary sealing element disposed in said groove in wiping contact with said other working surface, a back-up ring in said groove having a face engaging the resilient O-ring, said back-up ring being composed of a material having a coefficient of friction with respect to metal surfaces which is less than that of the resilient O-ring and having a hardness which is greater than that of the resilient O-ring, a second ring engaging said back-up ring and substantially closing the clearance gap between said working surfaces whereby extrusion of said back-up ring and said primary sealing element into said gap is prevented, said second ring having a higher modulus of elasticity than that of said back-up ring, thus forming a sealing arrangement whereby said resilient O-ring is capable of use at high temperatures and high pressures for extended periods of time.

2. A fluid seal as set forth in claim 1 wherein said resilient O-ring is composed of Viton A elastomer, said back-up ring is composed of polytetrafluoroethylene containing from 20 to 35% by volume of graphite, and said second ring is composed of nylon.

3. A fluid seal as set forth in claim 1 wherein said resilient O-ring is composed of Viton A elastomer, said back-up ring is composed of polytetrafluoroethylene containing from 20 to 35% by volume of graphite, and said second ring is composed of stainless steel.

4. A fluid seal as set forth in claim 1 wherein said O-ring, said back-up ring, and said second ring occupy from 81 to 87% of the volume of said annular groove at room temperature and substantially no more than 92% of the groove volume at 400° F.

5. A fluid seal for high temperature, high pressure sealing between two relatively movable members having slidably fitted complementary cylindrical working surfaces with a clearance gap therebetween, one of said members containing an annular groove juxtaposed to the other working surface, said seal comprising a resilient O-ring which is the primary sealing element disposed in said groove in wiping contact with said other working surface, a composite back-up ring in said groove having an inner face for engaging the resilient O-ring, said ring having a first portion of substantially rectangular cross section with a reduced diameter portion at its outer face and a second annular ring-like portion for engaging said first portion and having an outer annular cylindrical surface of slightly greater diameter than the outer surface of said ring whereby the clearance gap between said working surfaces is substantially closed to prevent extrusion of said back-up ring and said resilient O-ring therethrough, said first portion being of a material having a coefficient of friction with respect to metal surfaces which is less than that of the resilient O-ring while said second portion possesses a greater elasticity than that of the first portion whereby extrusion of said back-up ring and said primary sealing element into said gap is prevented.

6. A packing arrangement for mating members comprising a first member having a cylindrical mating surface; a second member movable concentrically with respect to said first member and having a surface mating with the cylindrical mating surface of said first member with a clearance gap between said surfaces; an annular groove formed in the mating surface of one of said members; an elastomeric O-ring disposed in said groove and in sealing engagement of the mating surface of the other member; a back-up ring disposed in said groove axially adjacent to and supporting the resilient O-ring, said back-up ring being composed of a material having a coefficient of friction with respect to metal surfaces which is less than that of the resilient O-ring and having a hardness which is greater than that of the resilient O-ring, a second ring circumscribing at least a portion of said back-up ring and substantially closing said clearance gap whereby the back-up ring provides a substantially rigid support for the resilient O-ring in an axially direction and said second ring prevents extrusion of said back-up ring and said O-ring.

7. A packing arrangement as in claim 6 wherein said second ring is nylon.

8. A packing arrangement as in claim 6 wherein said back-up ring is composed of polytetrafluoroethylene containing a graphite filler material in the range of from 20 to 35%.

9. A packing arrangement as set forth in claim 6 wherein said second ring consists of cast iron.

10. In combination a first member having a cylindrical mating surface; a second member axially movable concentrically with respect to said first member and having a cylindrical surface mating with the cylindrical mating surface of said first member; an annular groove formed in the cylindrical mating surface of one of said members; an elastomeric O-ring disposed in said groove in sealing engagement with the mating surface of the other member; a composite bimaterial back-up ring disposed in said groove on each side of and axially adjacent said O-ring, said O-ring and said bimaterial back-up rings incompletely filling said groove, said back-up ring comprising a first annular member having a shoulder portion at its cylindrical surface next adjacent the other of said mating cylindrical surfaces adapted for reception of a second annular member; and a high-strength second annular member encircling said first annular member at said shoulder portion and projecting above said first annular member into contact with the mating surface of the other of said members whereby extrusion of said back-up rings and said O-ring from said groove is prevented.

11. A fluid seal for high-temperature, high-pressure sealing between two relatively movable members having slidably fitted complementary cylindrical working surfaces with a clearance gap therebetween, one of which members contains an annular groove juxtaposed to the other working surface, said seal comprising an elastomeric O-ring disposed in said groove in sealing engagement with said other working surface; a bimaterial backup ring disposed in said groove on each side of and axially adjacent said O-ring, said O-ring and said bimaterial back-up rings incompletly filling said groove, said back-up ring comprising a first annular member having a shoulder portion at its cylindrical surface next adjacent the other working surface adapted for reception of a second annular member; and a high-strength second annular member encircling said first annular member at said shoulder portion and projecting above said first annular member into contact with said other working surface to substantially close the clearance gap between said working surfaces whereby extrusion of said back-up rings and said O-ring into said gap is prevented.

References Cited in the file of this patent

UNITED STATES PATENTS

| | | |
|---|---|---|
| 1,328,182 | Miller | Jan. 13, 1920 |
| 1,612,039 | Miller | Dec. 28, 1926 |
| 1,725,836 | Solberg | Aug. 27, 1929 |
| 2,386,873 | Mercier | Oct. 16, 1945 |
| 2,392,388 | Joyce | Jan. 8, 1946 |
| 2,437,814 | Hallen | Mar. 16, 1948 |
| 2,668,068 | Bredemeier | Feb. 2, 1954 |
| 2,705,177 | Waring | Mar. 29, 1955 |
| 2,728,620 | Krueger | Dec. 27, 1955 |
| 2,749,193 | Traub | June 5, 1956 |
| 2,809,080 | Mittell et al. | Oct. 8, 1957 |
| 2,931,673 | Gondek | Apr. 5, 1960 |

FOREIGN PATENTS

| | | |
|---|---|---|
| 669,881 | Great Britain | Apr. 9, 1952 |